United States Patent [19]

McGushion

[11] Patent Number: 5,054,822
[45] Date of Patent: Oct. 8, 1991

[54] ANTI-TWIST UNION

[75] Inventor: Kevin D. McGushion, Santa Monica, Calif.

[73] Assignee: Go, Inc., Whittier, Calif.

[21] Appl. No.: 561,277

[22] Filed: Aug. 1, 1990

Related U.S. Application Data

[63] Continuation of Ser. No. 403,741, Sep. 16, 1985, abandoned.

[51] Int. Cl.⁵ ............................................. F16L 35/00
[52] U.S. Cl. .................................. 285/330; 285/353; 285/384; 285/328
[58] Field of Search ................ 285/330, 328, 353, 384

[56] References Cited

U.S. PATENT DOCUMENTS

| 748,546 | 12/1903 | Vail | 285/353 X |
|---|---|---|---|
| 2,828,662 | 4/1958 | Antal | 285/353 X |
| 2,890,900 | 6/1959 | Williamson | 285/330 X |
| 3,468,566 | 9/1969 | Nietzel | 285/353 X |
| 3,521,910 | 7/1970 | Callahan, Jr. et al. | 285/353 |
| 3,847,421 | 11/1974 | Eschbaugh et al. | 285/353 |
| 4,116,472 | 9/1978 | Schmitt | 285/330 X |
| 4,236,736 | 12/1980 | Anderson | 285/330 X |
| 4,512,596 | 4/1985 | Obrecht | 285/330 X |
| 4,637,639 | 1/1987 | Jorgensen et al. | 285/330 X |
| 4,821,818 | 4/1989 | Mefferd | 285/330 X |

FOREIGN PATENT DOCUMENTS 0588902 6/1947 United Kingdom ................ 285/384

Primary Examiner—Dave W. Arola
Assistant Examiner—Carol I. Bordas
Attorney, Agent, or Firm—Donald D. Mon

[57] ABSTRACT

A compression union for joining two tubing segments together in a sealing relationship. Each segment has a head and a compression shoulder, and a sealing face. A first and second nut are threadedly joined and compress the segments together. The segments pass through respective nuts. A thrust cap is adapted to be firmly clamped. It includes an axially-extending tongue fitted into a respective axial spline, so that tightening the nut together exerts only axial force on the sealing faces, and the thrust cap prevents counter-rotation of the tubing segments relative to one another.

3 Claims, 2 Drawing Sheets

ANTI-TWIST UNION

CROSS REFERENCE TO OTHER APPLICATION

This is continuation of applicant's co-pending patent application Ser. No. 07/403,741, filed Sept. 16, 1985, entitled "Anti-Twist Union," now abandoned.

FIELD OF THE INVENTION

This invention relates to unions which couple two segments of tubing together, and especially to such a union which does not exert a twisting force on the tubings.

BACKGROUND OF THE INVENTION

Especially, but not exclusively in the field of piping of hazardous gases, it is customary to couple adjacent lengths of tubing by means of a compression-type union. Such tubing is generally made of a strong corrosion resistant metal, and each segment terminates at a hard peripheral sealing surface.

These beads are opposed to one another across a seal washer. Compressive coupling means, comprising a pair of threaded-together nuts, force the segments toward the washer so as to indent the seals into the washer to make a fluid seal. The nuts bear against respective shoulders on the segments, and the segments project through central passages in the nuts.

The objective of these unions is to compress the two beads against the washer as a stack. A union of this type has been in widespread usage for many years. In one of its most commonly-encountered applications, it is used to couple segments of metal tubing used in chemical process equipment—for example in chip manufacturing installations, where it is referred to as a VCR (vacuum compression rad) union. For purposes of making a highly reliable fluid tight seal between the tubing segments, it is fully adequate and is widely used.

The VCR fitting requires that the two beads be tightened down against the washer with a combined rotary and axial motion derived from the tightening of the threads which join the two nuts. If the ends of the tubing segments removed from the union are free to rotate, there is no problem. However, this is usually not the situation. Instead, these tubing segments are customarily already rigidly connected to some next element. As a consequence, rotation of the tubing segments caused by tightening of the union results in deformation of the segments as a consequence of what had also become a twisting force. What is intended to be a neat assembly turns into a group of randomly distorted tubing segments. This presents a less-than-professional appearance for what is often a high-cost piece of capital equipment.

Worse still is the fact that this deformation stores restorative energy tending to loosen the union. Considerable care must be taken to assure that the union is tight enough to prevent this. Even so, events such as earthquakes cause concern that such unions might become loose.

Attempts are made, of course, to attempt to avoid these consequences. Careful installation can at least reduce it, and thrust washers have been suggested as a means to reduce the rotational forces exerted on the beads. Such arrangements add complexity and expense to a unit which ought to be kept as elegantly simple as possible.

It is an object of this invention to provide a simple union in which the bead seals, while being tightened, are exposed only to axial compressive sources, and do not rotate relative to the washer. The objections to the conventional union are thereby entirely overcome and this is done with a simple restraint.

BRIEF DESCRIPTION OF THE INVENTION

A union according to this invention includes a pair of telescoping nuts, one internally threaded and the other externally threaded, the threads joining the nuts together. Each nut has a central passage which freely passes a respective tubing segment. Each segment has a compression shoulder facing a matching compression shoulder on the respective nut, and an oppositely facing peripheral sealing bead. A sealing washer is placed between the beads. So far, this describes a conventional VCR union.

This invention is characterized by the addition of a thrust cap between the shoulder of one of the nuts and the compression shoulder on its respective tubing segments to transmit axial compressive force between them. In addition the thrust cap includes a pair of rigid tongues engageable in an axial spline formed across the thread of the other of said nuts. The spline and tongue arrangement prevents transmission of torque to the sealing beads, and thereby isolates the tubing segments from forces which might twist them.

By the inclusion of a simple thrust cap and matching splines, the described defects of the conventional union are overcome.

The above and other features of this invention will be fully understood from the following detailed description and the accompanying drawings, in which:

DETAILED DESCRIPTION OF THE DRAWINGS

Figure 1:
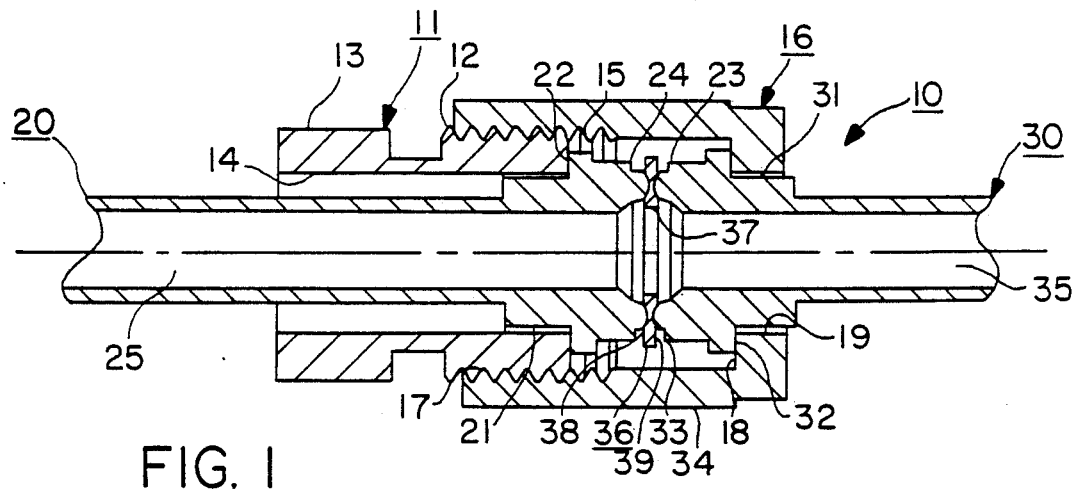
FIG. 1 is an axial section showing the prior art.
Figure 2:
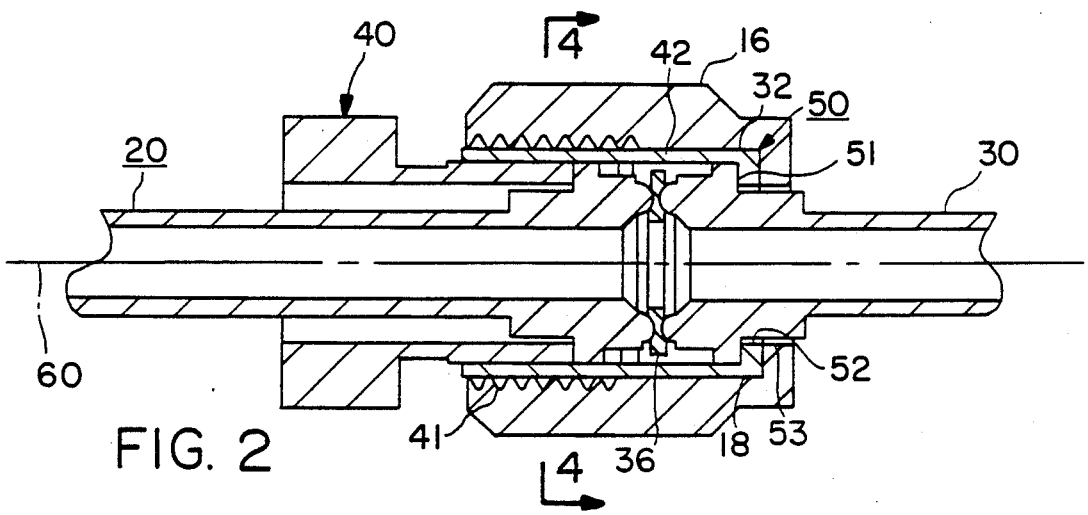
FIG. 2 is an axial cross-section of the presently-preferred embodiment of the invention taken at line 2—2 in FIG. 4.
Figure 3:
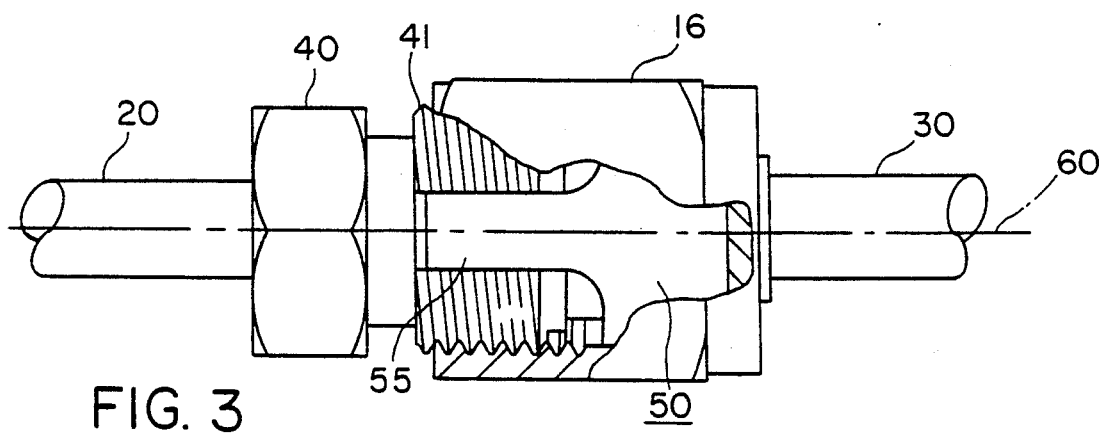
FIG. 3 is a bottom view of FIG. 2, partly cutaway.
Figure 4:
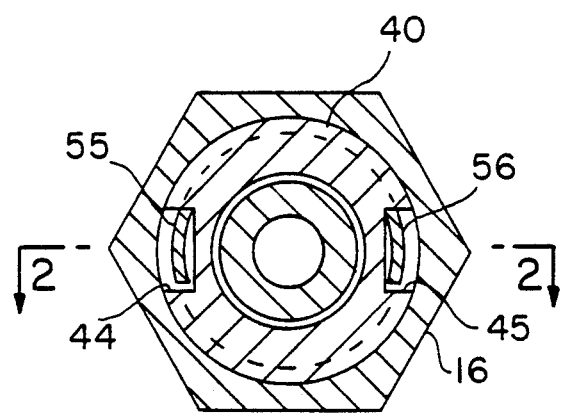
FIG. 4 is a cross-section taken at line 4—4 in FIG. 2.
Figure 5:
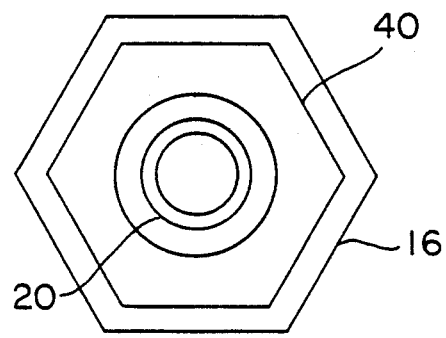
FIG. 5 is a left hand end view of FIG. 3.
Figure 6:
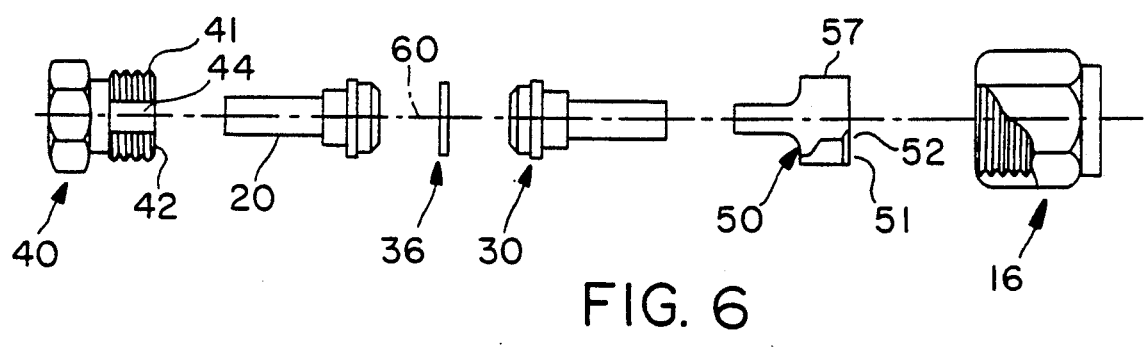
FIG. 6 is an exploded view of the parts of the union.

FIG. 1 shows a conventional VCR union 10. It comprises a first nut 11 with an external thread 12, a wrench engaging section 13, usually a hexagonal array, a central passage 14, and a compression shoulder 15.

A second nut 16 has an internal thread 17 for mating with thread 12, a compression shoulder, 18 and a central passage 19.

A first tubing segment 20 passes through passage 14 with a side clearance 21. A peripheral compression shoulder 22 faces shoulder 15. A peripheral sealing bead 23 extends around the passage on sealing face 24. A flow passage 25 extends axially from end to end of the segment, and terminates within bead 23.

A second tubing segment 30 is similar to segment 20. It passes through passage 19 with a side clearance 31. A peripheral compression shoulder 32 faces shoulder 18. A peripheral sealing bead 33 extends around the passage on sealing face 34. A flow passage 35 extends axially from and to end of the segment, and terminates within bead 33.

A sealing washer 36 has a central hole 37 and two initially flat faces 38, 39. It is placed between faces 24 and 34 and continues the flow passages 25 and 35 the enlarged portion at the first ends of the segments, between the compression shoulder and sealing face is sometimes referred to as a "head".

The sealing washer has been indented by the beads as shown, which makes the fluid seal between the two tubing segments. The described defects of this arrangement are evident from this FIG. The union has been completed by tightening the nuts against one another. When the compression shoulders engage, they transmit both axial force and torque, tending to rotate the tubing segments counter-rotatingly. If the segments at their ends away from the union are anchored, this represents a twist, often as much as 80 degrees at the nuts which may and often does distort the segments.

This invention overcomes this disadvantage by the means shown in FIGS. 2-6. Because of their substantial identity, all but the first nut and the additional structure in FIGS. 2-6 bear identical reference numbers with those shown in FIGS. 1-6.

In this invention, the first nut (nut 40 in FIGS. 2-6) has an external thread 41 for mating with thread 12, a compression shoulder 42 and a central passage 45, as in nut 11. It is modified by one or more (in the preferred device, a plurality) of axially-extending splines 44, 45 formed across thread 41.

In addition, a thrust cap 50 is provided. This cap includes an internal flange 51 having a central hole 52 which passes second tubing segment 30 with a side clearance 53. This flange is interposed between compression shoulder 18 and 32, and transmits compressive force between them.

Tongues 55, 56 are integral with the flange. They should be equal in number to the number of splines. Conveniently, a cylindrical rim 57 forms a cap-like base for both the flange and for the tongues. The tongues extend along and in the splines, and prevent rotation of the second tubing segment while the second nut is tightened. During tightening, the first nut is simply held in position without turning it.

Now it will be seen that the thrust cap prevents transmission of torque across the sealing washer, because the spline or splines prevent it. The union can thereby be tightened without concern for twisting the tubing segments, and a neat tubing assembly will result, free of distortion and free of stored energy from deformation.

The union has a central axis 60 at the joinder of the nuts and segments.

As in all such unions, materials of construction suitable for handling the intended fluids will be used. Suitable stainless steels are most frequently used. The relative properties of the beads (or even their identity) and the washer are selected so the illustrated deformation can occur. Of course, reversal of the bead and washer surface is within the intended scope of the invention, with the washer faces contoured and the tubing faces flat, but the illustrated embodiment is preferred. Also, the spline and tongue arrangement can be reversed between the nuts.

This invention is not to be limited by the embodiment shown in the drawings and described in the description, which are given by way of example and not of limitation, but only in accordance with the scope of the appended claims.

I claim:

1. In a union for joining two tubing segments together which union has a central axis and includes:

a first nut with an external thread, a wrench-engaging section, a central passage and a compression shoulder;

a second nut with an internal thread for mating with said external thread, a compression shoulder, and a central passage, the union including no other nuts or threads;

a first tubing segment passing through the passage in the first nut with a side clearance, a head at one end thereof, a peripheral compression shoulder on said head facing the compression shoulder on the first nut and a flow passage extending from end to end of said first segment;

a second tubing segment passing through said passage in said second nut with a side clearance, a head at one end thereof, a peripheral compression shoulder on said head facing said compression shoulder on said second nut, and a flow passage extending from end to end of said second segment;

a sealing face on each of said heads at said one end of said segments, said sealing faces facing toward one another;

a peripheral bead formed on each said sealing face, and a mating surface on each said sealing face to form a pair of compressive fluid seals, a sealing washer interposed between said sealing beads for compressive fluid sealing content, tightening the nuts serving to axially press the heads against the washer to form said fluid seals; the improvement comprising:

a thrust cap having a flat annular flange disposed between the compression shoulders respective to said second nut to be firmly axially clamped between them when the union is tightened, an axially-extending tongue rigidly integral with said flange, and an axially extending spline in said first nut, said tongue fitting in said spline and preventing rotation of said thrust cap relative to said first nut, thereby preventing transmission of torque between the compression shoulders relative to both of said nuts when said second nut is tightened on said first nut, the forces exerted against the washer being purely axial, and said thrust cap preventing counter-rotation of the tubing segments relative to each other.

2. Apparatus according to claim 1 in which a plurality of said splines and tongues is provided.

3. Apparatus according to claim 1 in which said washer has a pair of opposite flat matching surfaces to be engaged by said beads to form said fluid seals.

* * * * *